(12) United States Patent
Tanida et al.

(10) Patent No.: US 11,001,703 B2
(45) Date of Patent: May 11, 2021

(54) AQUEOUS EMULSION AND ADHESIVE USING SAME

(71) Applicant: KURARAY CO., LTD., Kurashiki (JP)

(72) Inventors: Tatsuya Tanida, Tainai (JP); Keisuke Morikawa, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 333 days.

(21) Appl. No.: 16/065,551

(22) PCT Filed: Dec. 20, 2016

(86) PCT No.: PCT/JP2016/005200
§ 371 (c)(1),
(2) Date: Jun. 22, 2018

(87) PCT Pub. No.: WO2017/110091
PCT Pub. Date: Jun. 29, 2017

(65) Prior Publication Data
US 2020/0291217 A1    Sep. 17, 2020

(30) Foreign Application Priority Data

Dec. 25, 2015 (JP) .............................. JP2015-254225

(51) Int. Cl.
*C08L 29/04* (2006.01)
*C09J 129/04* (2006.01)

(52) U.S. Cl.
CPC ............. *C08L 29/04* (2013.01); *C09J 129/04* (2013.01); *C08L 2201/52* (2013.01)

(58) Field of Classification Search
CPC ...................................................... C09J 129/04
See application file for complete search history.

(56) References Cited

U.S. PATENT DOCUMENTS

| 4,219,454 | A | * | 8/1980 | Iacoviello | ............ | C09D 131/04 |
| | | | | | | 524/812 |
| 4,694,056 | A | * | 9/1987 | Lenney | ................. | C08F 220/08 |
| | | | | | | 526/202 |
| 5,545,684 | A | | 8/1996 | Jakob et al. | | |
| 2003/0065089 | A1 | | 4/2003 | Betremieux et al. | | |
| 2008/0311415 | A1 | | 12/2008 | Castaing et al. | | |
| 2010/0035065 | A1 | | 2/2010 | Terrenoire et al. | | |
| 2010/0130679 | A1 | | 5/2010 | Jakob et al. | | |
| 2012/0260975 | A1 | * | 10/2012 | Gerard | ............. | B32B 17/10743 |
| | | | | | | 136/251 |
| 2012/0261070 | A1 | | 10/2012 | Gerst et al. | | |
| 2013/0302573 | A1 | * | 11/2013 | Terfloth | ................ | B29C 63/003 |
| | | | | | | 428/192 |

FOREIGN PATENT DOCUMENTS

| CA | 2 362 979 A1 | 8/2000 |
| CN | 102532386 A | 7/2012 |
| CN | 103476886 A | 12/2013 |
| CN | 103215825 B | 9/2014 |
| CN | 104497927 A | 4/2015 |
| JP | 8-80116 A | 3/1996 |
| JP | 9-255894 A | 9/1997 |
| JP | 10-121017 A | 5/1998 |
| JP | 11-106727 A | 4/1999 |
| JP | 11-227340 A | 8/1999 |
| JP | 2001-123138 A | 5/2001 |
| JP | 2002-537308 A | 11/2002 |
| JP | 2003-523476 A | 8/2003 |
| JP | 4393082 B2 | 1/2010 |
| JP | 4772175 B2 | 9/2011 |

(Continued)

OTHER PUBLICATIONS

International Search Report dated Mar. 7, 2017, in PCT/JP2016/005200 filed Dec. 20, 2016.

(Continued)

*Primary Examiner* — Jeffrey C Mullis

(74) *Attorney, Agent, or Firm* — Oblon, McClelland, Maier & Neustadt, L.L.P.

(57) ABSTRACT

The present invention provides an aqueous emulsion excellent in heat resistance, water resistance (particularly, hot water resistance and boiling resistance), and viscosity stability. The present invention also provides an adhesive containing the aqueous emulsion, forming an adhesive layer resistant to staining, and ensuring a high level of safety. The present invention relates to an aqueous emulsion containing an ethylenically unsaturated monomer unit-containing polymer (A) as a dispersoid and vinyl alcohol polymer (B) as a dispersant, wherein, the ethylenically unsaturated monomer unit-containing polymer (A) includes a structural unit derived from a radical-polymerizable ethylenically unsaturated monomer (a) having a functional group represented by the following general formula (W), and the degree of saponification of the vinyl alcohol polymer (B) is 80 mol % or more:

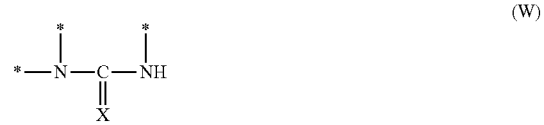

(W)

wherein, X is an oxygen atom or sulfur atom, and * represents a bond.

19 Claims, No Drawings

(56) References Cited

FOREIGN PATENT DOCUMENTS

JP        5296540 B2    9/2013

OTHER PUBLICATIONS

Extended European Search Report dated Jun. 11, 2019 in Patent Application No. 16877995.7, 9 pages.
Chinese Office Action dated Jul. 21, 2020 in Patent Application No. 201680076076.X (with English translation), 16 pages.
Wang Mengzhong, et al., "Adhesive Application Manual" Chemical Industry Press, $1^{st}$ Edition, Nov. 1987, pp. 250-252.

\* cited by examiner

AQUEOUS EMULSION AND ADHESIVE USING SAME

TECHNICAL FIELD

The present invention relates to an aqueous emulsion excellent in heat resistance, water resistance (particularly hot water resistance and boiling resistance), and viscosity stability and an adhesive containing the aqueous emulsion. The present invention particularly relates to an adhesive forming an adhesive layer resistant to staining.

BACKGROUND ART

Polyvinyl acetate aqueous emulsions obtained by polymerizing vinyl acetate with the aid of a polyvinyl alcohol (which may hereinafter be abbreviated as "PVA") serving as a protective colloid have been conventionally widely used, for example, in adhesives for paper processing, woodworking, and fiber processing and in paints. In particular, it is a widespread practice to use a PVA as a protective colloid in combination with a carboxy group-containing unsaturated monomer when water resistance or adhesiveness is required.

However, an adhesive using an aqueous emulsion prepared as described above has the disadvantages of having low heat resistance and being insufficient in properties such as hot water resistance and boiling resistance, although such an adhesive shows improvement in adhesiveness and water resistance.

Several solutions have been proposed to overcome the above disadvantages. For example, Patent Literature 1 proposes an emulsion adhesive containing a polyaldehyde capable of releasing aldehyde groups in an acid medium. This approach, however, cannot achieve sufficient viscosity stability, although being capable of yielding high water resistance. Furthermore, since a strong acid, aluminum metal, or the like is used in the adhesive as a catalyst for crosslinking reaction, the approach has a disadvantage in that such a catalyst can accelerate strength deterioration of an adhesive layer and adherend such as wood and cause staining of the adhesive layer (glue line).

Patent Literature 2 proposes an emulsion prepared by copolymerization of a vinyl acetate monomer and N-methylol acrylamide. However, this approach fails to achieve sufficient water resistance at low temperatures, and also has an environmental disadvantage in that formaldehyde is produced when the emulsion is used as an adhesive.

Patent Literature 3 proposes emulsion-polymerizing vinyl acetate or emulsion-copolymerizing vinyl acetate and a (meth)acrylic acid ester with the aid of a modified PVA incorporating ethylene and serving as a protective colloid (this PVA may be simply referred to as "ethylene-modified PVA" hereinafter). With these approaches, some degree of improvement in heat resistance and hot water resistance can be achieved; however, the improvement in heat resistance and hot water resistance is still insufficient, and satisfactory results cannot be obtained for final bond strength or boiling resistance.

Patent Literature 4 proposes using an ethylene-modified PVA as a protective colloid in combination with a (co) polymer of a carboxy group-containing unsaturated monomer or with an amide-modified PVA for polymerization of vinyl acetate. However, this approach still cannot achieve sufficient heat resistance either There have been disclosed an aqueous coating composition (Patent Literature 5), pavement marking paint (Patent Literature 6), and water-proof wood surface treatment agent (Patent Literature 7) which are composed of an aqueous emulsion of a vinyl copolymer obtained by using as one component an ureido group-containing monomer such as methacrylamido-ethyl-ethylene urea and emulsion polymerizing the ureido group-containing monomer and another copolymerizable vinyl monomer. However, the performance of these products as adhesives is unknown. Additionally, a flooring adhesive formulation (Patent Literature 8) composed of an aqueous emulsion as described above has been disclosed. However, there is no mention of the heat resistance, water resistance, hot water resistance, and boiling resistance of the flooring adhesive formulation and the levels of such properties are left unknown.

CITATION LIST

Patent Literature

Patent Literature 1: JP 08-060116 A
Patent Literature 2: JP 10-121017 A
Patent Literature 3: JP 11-106727 A
Patent Literature 4: JP 2001-123138 A
Patent Literature 5: JP 09-256894 A
Patent Literature 6: JP 4393082 B
Patent Literature 7: JP 5296540 B
Patent Literature 8: JP 2003-523476 A

SUMMARY OF INVENTION

Technical Problem

The present invention has been made in view of the circumstances described above, and an object of the present invention is to provide an aqueous emulsion excellent in heat resistance, water resistance (particularly hot water resistance and boiling resistance), and viscosity stability. It is also an object of the present invention to provide an adhesive containing the aqueous emulsion, forming an adhesive layer resistant to staining, and ensuring a high level of safety.

Solution to Problem

As a result of intensive studies, the present inventors have found that the above disadvantages can be solved by an aqueous emulsion containing an ethylenically unsaturated monomer unit-containing polymer (A) having a specific structural unit as a dispersoid and vinyl alcohol polymer (B) as a dispersant and an adhesive containing the aqueous emulsion. Based on this finding, the inventors have completed the present invention.

That is, the present disclosure relates to the following inventions.

[1] An aqueous emulsion including an ethylenically unsaturated monomer unit-containing polymer (A) as a dispersoid and a vinyl alcohol polymer (B) as a dispersant, wherein the ethylenically unsaturated monomer unit-containing polymer (A) contains a structural unit derived from a radical-polymerizable ethylenically unsaturated monomer (a) having a functional group represented by the following general formula (W), and the degree of saponification of the vinyl alcohol polymer (B) is 80 mol % or more:

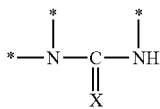

(W)

wherein, X is an oxygen atom or a sulfur atom, and * represents a bond.

[2] The aqueous emulsion according to [1], wherein the ethylenically unsaturated monomer (a) is at least one ethylenically unsaturated monomer selected from the group consisting of a compound represented by the following general formula (I), a compound represented by the following general formula (II), and a compound represented by the following general formula (III):

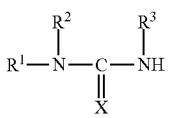

(I)

wherein,
X is an oxygen atom or a sulfur atom,
$R^1$ represents a group selected from the group consisting of a 2-(2-carboxyacrylamide)ethyl group, a vinyl group, an allyl group, an isopropenyl group, an acryloyl group, a methacryloyl group, a 2-hydroxy-3-(allyloxy)propyl group, and a functional group represented by the following general formula (IV):

(IV)

wherein, $R^4$ represents a 2-hydroxy-3-(allyloxy)propyl group, a group, a methacryloyl group, acryloyl group, or a methacryloyloxyaceto group, $A^1$ represents —O— or —$NR^5$—, $R^5$ represents a hydrogen atom or a $C_1$ to $C_8$ alkyl group, and Alk represents a $C_2$ to $C_8$ alkylene chain, and
$R^2$ and $R^3$ are the same or different and represent a hydrogen atom or a $C_1$ to $C_8$ alkyl group;

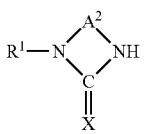

(II)

wherein, X and $R^1$ are as defined above, $A^2$ represents an alkylene chain having 2 or 3 carbon atoms, and the alkylene chain may have a substituent and may have a carbonyl group between the carbon atoms; and

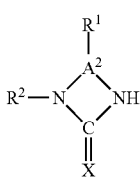

(III)

wherein, X, $A^2$, $R^1$, and $R^2$ are as defined above.

[3] The aqueous emulsion according to [1] or [2,] wherein the ethylenically unsaturated monomer (a) includes a compound represented by the following general formula (II):

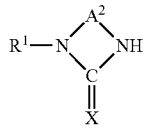

(II)

wherein,
X is an oxygen atom or a sulfur atom,
$R^1$ represents a group selected from the group consisting of a 2-(2-carboxyacrylamido)ethyl group, a vinyl group, an allyl group, an isopropenyl group, an acryloyl group, a methacryloyl group, a 2-hydroxy-3-(allyloxy)propyl group, and a functional group represented by the following general formula (IV):

(IV)

wherein, $R^4$ represent a 2-hydroxy-3-(allyloxy)propyl group, a vinyl group, a methacryloyl group, an acryloyl group, or a methacryloyloxyaceto group, $A^1$ represents —O— or —$NR^5$—, $R^5$ represents a hydrogen atom or a $C_1$ to $C_8$ alkyl group, and Alk represents a $C_2$ to $C_8$ alkylene chain, and
$A^2$ represents an alkylene chain having 2 or 3 carbon atoms, and the alkylene chain may have a substituent and may have a carbonyl group between the carbon atoms.

[4] The aqueous emulsion according to [2] or [3], wherein $R^1$ is a functional group represented by the following general formula (IV):

(IV)

wherein, $R^4$ represents a 2-hydroxy-3-(allyloxy)propyl group, a vinyl group, a methacryloyl group, an acryloyl group, or a methacryloyloxyaceto group, $A^1$ represents —O— or —$NR^5$—, $R^5$ represents a hydrogen atom or a $C_1$ to $C_8$ alkyl group, and Alk represents a $C_2$ to $C_8$ alkylene chain,

[5] The aqueous emulsion according to any one of [2] to [4], wherein X is an oxygen atom, $A^2$ represents an alkylene chain having 2 carbon atoms, and Alk represents a $C_2$ to $C_6$ alkylene chain,

[6] The aqueous emulsion according to any one of [2] to [5], wherein $A^2$ is an unsubstituted alkylene chain,

[7] The aqueous emulsion according to any one of [1] to [5], wherein the ethylenically unsaturated monomer (a) is N-(2-methacryloyloxyethyl)ethylene urea or N-(2-methacrylamidoethyl)ethylene urea,

[8] The aqueous emulsion according to any one of [1] to [7], wherein the ethylenically unsaturated monomer unit-containing polymer (A) includes a copolymer of the ethylenically unsaturated monomer (a) and a copolymerizable ethylenically unsaturated monomer (b).

[9] The aqueous emulsion according to [8], wherein the ethylenically unsaturated monomer (b) is at least one selected from the group consisting of a vinyl ester monomer, a (meth)acrylic acid ester monomer, a styrene monomer, and a diene monomer.

[10] The aqueous emulsion according to, any one of [1] to [9], wherein the mass ratio (A)/(B) of the polymer (A) to the vinyl alcohol polymer (B) is 98/2 to 80/20 on a solids basis.

[11] The aqueous emulsion according to any one of [1] to [10], wherein the vinyl alcohol polymer (B) is an ethylene-modified vinyl alcohol polymer.

[12] An adhesive containing the aqueous emulsion according to any one of [11] to [11].

[13] A method for producing the aqueous emulsion according to any one of [1] to [11], wherein a monomer including the ethylenically unsaturated monomer (a) is polymerized in the presence of the vinyl alcohol polymer (B).

Advantageous Effects of Invention

The aqueous emulsion of the present invention is excellent in heat resistance, water resistance (particularly hot water resistance and boiling resistance), and viscosity stability. The adhesive containing the aqueous emulsion forms an adhesive layer resistant to staining. Furthermore, the present invention neither requires the use of a crosslinking agent substantially nor involves production of volatile low molecules such as formaldehyde, and thus can provide an adhesive ensuring a high level of safety.

DESCRIPTION OF EMBODIMENTS

Hereinafter, the present invention is described in detail.

<Aqueous Emulsion>

The aqueous emulsion of the present invention is an aqueous emulsion including an ethylenically unsaturated monomer unit-containing polymer (A) as a dispersoid and vinyl alcohol polymer (B) as a dispersant, wherein the ethylenically unsaturated monomer unit-containing polymer (A) contains a structural unit derived from a radical-polymerizable ethylenically unsaturated monomer (a) having a functional group represented by the following general formula (W), and the degree of saponification of the vinyl alcohol polymer (B) is 80 mol % or more:

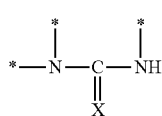
(W)

wherein X is an oxygen atom or a sulfur atom, and * represents a bond.

In the present specification, the upper limits and lower limits of value ranges (ranges of, for example, the contents of components, values calculated for components, and values of physical properties) can be combined appropriately Polymer (A)

The ethylenically unsaturated monomer unit-containing polymer (A) which is a dispersoid of the aqueous emulsion of the present invention includes, as described above, a structural unit derived from a radical-polymerizable ethylenically unsaturated monomer (a) having a functional group represented by the above general formula (W).

The ethylenically Unsaturated monomer (a) is preferably at least one ethylenically unsaturated monomer selected from the group consisting of a compound represented by the following general formula (I), a compound represented by the following general formula (II), and a compound represented by the following general formula (III):

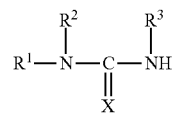
(I)

wherein,

X is an oxygen atom or a sulfur atom, $R^1$ represents a group selected from the group consisting of a 2-(2-carboxyacrylamido)ethyl group, a vinyl group, an allyl group, an isopropenyl group, an acryloyl group ($H_2C$=CH—C(=O)—), a methacryloyl group ($H_2C$=C($CH_3$)—C(=O)—), a 2-hydroxy-3-(allyloxy)propyl group, and a functional group represented by the following general formula (IV):

wherein, $R^4$ represents a 2-hydroxy-3-(allyloxy)propyl group, a vinyl group, a methacryloyl group, an acryloyl group, or a methacryloyloxaceto group ($CH_2$=C($CH_3$)—CO—O—$CH_2$—CO—), $A^1$ represents —O— or —$NR^5$—, $R^5$ represents a hydrogen atom or a $C_1$ to $C_8$ alkyl group, and Alk represents a $C_2$ to $C_8$ alkylene chain, and $R^2$ and $R^3$ are the same or different and represent a hydrogen atom or a $C_1$ to $C_8$ alkyl group;

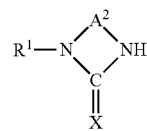
(II)

wherein, X and $R^1$ are as defined above, $A^2$ represents an alkylene chain having 2 or 3 carbon atoms, and the alkylene chain may have a substituent and may have a carbonyl group between the carbon atoms; and

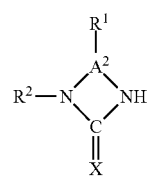
(III)

wherein, X, $A^2$, $R^1$, and $R^2$ are as defined above.

$R^1$ can be selected from a 2-(2-carboxyacrylamido)ethyl group, a vinyl group, an allyl group, is propenyl group, an acryloyl, group, a methacryloyl group, a 2-hydroxy-3-(allyloxy)propyl group, and a functional group represented by the following general formula (IV):

wherein, the symbols are as defined above.

In the above general formulae (I), (II), and (III), X is preferably an oxygen atom. In the above general formulae (I), (II), and (III), $R^1$ is preferably a 2-(2-carboxyacrylamido)ethyl group, acryloyl group, methacryloyl group, 2-hydroxy-3-(allyloxy)propyl group, or functional group represented by the general formula (IV), more preferably an acryloyl group, methacryloyl group, 2-hydroxy-3-(allyloxy)propyl group, or functional group represented by the general formula (IV), and even more preferably a functional group represented by the general formula (IV).

In the above general formulae (I), (II), and (III), $R^2$ and $R^3$ are the same or different, and are each preferably a hydrogen atom or $C_1$ to $C_6$ alkyl group, more preferably a hydrogen atom or $C_1$ to $C_4$ alkyl group.

The $C_1$ to $C_8$ alkyl group represented by $R^2$ and $R^3$ may be linear or branched. Examples of the alkyl group include methyl, ethyl, n-propyl, isopropyl, n-butyl, isobutyl, sec-butyl, 2-methylpropyl, tert-butyl, n-pentyl, isopentyl, sec-pentyl, neopentyl, 1-ethyl propyl 1,1-dimethylpropyl, 1,2-dimethylpropyl, n-hexyl, 1-methylpentyl, 2-methylpentyl, 3-methylpentyl, 4-methylpentyl group (isohexyl group), 1-ethylbutyl, 2-ethylbutyl, 1,1-dimethylbutyl, 1,2-dimethylbutyl, 1,3-dimethylbutyl, 1,4-dimethylbutyl, 2,2-dimethylbutyl, 2,3-dimethylbutyl, 3,3-dimethylbutyl, 1-ethyl-2-methyl-propyl, 1,1,2-trimethylpropyl, n-heptyl, 2-methylhexyl, n-octyl, isooctyl, tert-octyl, 2-ethylhexyl, and 3-methylheptyl groups.

In the above general formulae (II) and (III), the alkylene chain represented by $A^2$ and having 2 or 3 carbon atoms may have a substituent and may have a carbonyl group between the carbon atoms. That is, the alkylene, represented by $A^2$ and having 2 or 3 carbon atoms may be an alkylene chain having a substituent, alkylene chain having a carbonyl group between the carbon atoms, or alkylene chain having a substituent and having a carbonyl group between the carbon atoms. Additionally, in the above general formulae (II) and (III), $A^2$ is preferably an alkylene chain having 2 carbon atoms and more preferably an unsubstituted alkylene chain having 2 carbon atoms. That an alkylene chain represented by $A^2$ of the general formula (III) is unsubstituted means that all the groups bonded to the carbon atoms are hydrogen atoms, except for $R^1$.

Examples of the $C_1$ to $C_8$ alkyl group represented by $R^5$ include those previously mentioned as examples of the $C_1$ to $C_8$ alkyl group represented by $R^2$ and $R^3$. Examples of the $C_2$ to $C_8$ alkylene chain represented by Alk of the general formula (IV) include ethylene, n-propylene, isopropylene, n-butylene, isobutylene, n-pentylene, 1-methyl-n-butylene, 2-methyl-n-butylene, 3-methyl-n-butylene, 1,1-dimethyl-n-propylene, 1,2-dimethyl-n-propylene, 2,2-dimethyl-n-propylene, 1-ethyl-n-propylene, n-hexylene, 1-methyl-n-pentylene, 2-methyl-n-pentylene, 3-methyl-n-pentylene, 4-methyl-n-pentylene, 1,1-dimethyl-n-butylene, 1,2-dimethyl-n-butylene, 1,3-dimethyl-n-butylene, 2,2-dimethyl-n-butylene, 2,3-dimethyl-n-butylene, 3,3-dimethyl-n-butylene, 1-ethyl-n-butylene, 2-ethyl-n-butylene, 1,1,2-trimethyl-n-propylene, heptylene, and n-octylene groups. As the $C_2$ to $C_8$ alkylene chain represented by Alk, a $C_2$ to $C_6$ alkylene chain is preferred, a $C_2$ to $C_4$ alkylene chain is more preferred, and a $C_2$ to $C_3$ alkylene chain is even more preferred. In the general formulae (II) and (III), the $C_2$ to $C_6$ alkylene chain represented by Alk of the general formula (IV) may have a substituent and may have a carbonyl group between the carbon atoms as the alkylene chain represented by $A^2$ may have.

Examples of the substituent include, but are not limited to, a group selected from the group consisting of a $C_1$ to $C_4$ alkyl group, $C_1$ to $C_4$ alkoxy group, and hydroxy group. Examples of the alkyl group include those mentioned as examples for $R^2$ and $R^3$. Examples of the alkoxy group include met boxy, ethoxy, n-propoxy, isopropoxy, n-butoxy, sec-butoxy, and tert-butoxy groups.

The ethylenically unsaturated monomer (a) is preferably, but not limited to, a compound represented by the general formula (II) and/or compound represented by the general formula (III).

The compound represented by the general formula (II) is preferably a compound in which $R^1$ represents a functional group represented by the general formula (IV), X is, an oxygen atom, $A^2$ represents an alkylene chain having 2 carbon atoms, $R^4$ represents a 2-hydroxy-3-(allyloxy)propyl group, vinyl group, methacryloyl group, acryloyl group, or methacryloyloxyaceto group, $A^1$ represents —O— or —$NR^5$—, $R^5$ represents a hydrogen atom or $C_1$ to $C_8$ alkyl group, and Alk represents a $C_2$ to $C_6$ alkylene chain. The compound represented by the general formula (II) is more preferably a compound in which $R^1$ represents a functional group represented by the general formula (IV), X is an oxygen atom, A represents an alkylene chain having 2 carbon atoms, $R^4$ represents a 2-hydroxy-3-(allyloxy)propyl group, vinyl group, methacryloyl group, acryloyl group, or methacryloyloxyaceto group, $A^1$ represents —O— or —$NR^5$—, $R^5$ represents a hydrogen atom or $C_1$ to $C_8$ alkyl group, and Alk represents a $C_2$ to $C_4$ alkylene chain. The compound represented by the general formula (II) is even more preferably a compound in which $R^1$ represents a functional group represented by the general formula (IV), X is an oxygen atom, $A^2$ represents an unsubstituted alkylene chain having 2 carbon atoms, $R^4$ represents a 2-hydroxy-3-(allyloxy)propyl group, vinyl group, methacryloyl group, acryloyl group, or methacryloyloxyaceto group, $A^1$ represents —O— or —$NR^5$—, $R^5$ represents a hydrogen atom or $C_1$ to $C_8$ alkyl group, and Alk represents a $C_2$ to $C_4$ alkylene chain.

Examples of the ethylenically unsaturated monomer (a) include N-(2-methacryloyloxyethyl)ethylene urea, N-(2-acryloyloxyethyl)ethylene urea, N-(methacrylamidomethyl) ethylene urea, N-(acrylamidomethy)ethylene urea. N-(2-methacrylamidoethyl)ethylene urea, N-(2-acrylamidoethyl) ethylene urea, N-vinylethyleneurea, N-vinyloxyethylethyleneurea, N-[(2-(methacryloyloxyacetamido)ethyl]-N,N'-ethylene urea, N-[(2-(acryloyloxyacetamido)ethyl]-ethylene urea, 1-[2-[[2-hydroxy-3-(2-propenyloxy)propyl]amino]ethyl]-2-imidazolidone, N-methacrylamidomethyl urea, N-methacryloyl urea, N-(3-[1,3-diazacyclohexan-2-one]propyl)methacrylamide, N-hydroxyethylethyleneurea, N-aminoethylethyleneurea, N-(3-allyloxy-2-hydroxypropyl)aminoethylethyleneurea, N-methacrylaminoethylethyleneurea, N-acrylaminoethylethyleneurea, N-methacryloxyacetoxyethylethyleneurea, N-methacryloxyacetaminoethylethyleneurea, N-di(3-allyloxy-2-hydroxypropyl)aminoethylethyleneurea, and allylalkyl ($C_1$ to $C_8$) ethylene urea. Among these, N-(2-methacryloyloxyethyl)ethylene urea and N-(2-methacrylamidoethyl) ethylene urea are particularly preferred.

In the aqueous emulsion of the present invention, the above unsaturated monomers (a) may be used alone or in combination with one another.

The content of the ethylenically unsaturated monomer (a) unit is preferably 0.1 to 10 mass %, more preferably 0.2 to 80 mass %, and even more preferably 0.5 to 5.0 mass % with respect to the total amount of the ethylenically unsaturated monomer unit. If the content of the ethylenically unsaturated monomer (a) unit is less than 0.1 mass %, the aqueous emulsion may be insufficient in heat resistance, water resistance, hot water resistance, and boiling resistance. If the content of the ethylenically unsaturated monomer (a) unit is more than 10 mass %, it may be difficult to carry out polymerization.

The ethylenically unsaturated monomer unit-containing polymer (A) is preferably a copolymer of the ethylenically unsaturated monomer (a) and another copolymerizable ethylenically unsaturated monomer (b). Examples of the ethylenically unsaturated monomer (b) include vinyl ester monomers, (meth)acrylic acid ester monomers, α-β-unsaturated monocarboxylic or dicarboxylic acid monomers, diene monomers, olefin monomers, (meth)acrylamide monomers, nitrile monomers, aromatic vinyl monomers, heterocyclic vinyl monomers, vinyl ether monomers, allyl monomers, and polyfunctional acrylate monomers. These may be used alone or in combination with one another. Among these, at least one unsaturated monomer selected from the group, consisting of vinyl ester monomers, (meth)acrylic acid ester monomers, styrene monomers, and diene monomers are preferred, and vinyl ester monomers are more preferred. The term "(meth)acryl" as used herein collectively refers to "acryl" and "methacryl".

Examples of the vinyl ester monomer include vinyl formate, vinyl acetate, vinyl propionate, vinyl butyrate, vinyl isobutyrate, vinyl pivalate, vinyl versatate, vinyl cinnamate, vinyl crotonate, vinyl decanoate, vinyl hexanoate, vinyl octanoate, vinyl isononanoate, vinyl trimethylacetate, vinyl 4-tert-butylbenzoate, vinyl 2-ethylhexanoate, vinyl caproate, vinyl caprylate, vinyl laurate, vinyl palmitate, vinyl stearate, vinyl oleate, and vinyl benzoate. Vinyl acetate is particularly preferred from an industrial point of view.

(Vinyl Alcohol Polymer (B))

The degree of saponification of the vinyl alcohol polymer (B) (a vinyl alcohol polymer may hereinafter be abbreviated as a "PVA") used as a dispersant in the present invention is 80 mol % or more, preferably 83 mol % or more, and more preferably 85 mol % or more. If the degree of saponification is less than 80 mol %, the effect of the vinyl alcohol polymer (B) as a protective colloid is so small that a stable aqueous emulsion cannot be obtained. The upper limit of the degree of saponification is not particularly limited, and is preferably 99.9 mol % or less and more preferably 99.5 mol % or less. If the degree of saponification is more than 99.9 mol %, the resultant aqueous emulsion may have poor viscosity stability. PVAs having different degrees of saponification which are 80 mol % or more may be used in combination. The degree of saponification is determined by a method specified in JIS K 6726 (1994). The PVA may be an unmodified PVA or modified PVA as long as the degree of saponification of the PVA is 80 mol % more. Examples of the modified PVA include: anion-modified PVAs such as sulfonic acid group-modified PVAs and carboxylic acid group-modified PVAs; cation-modified PVAs such as quaternary amine group-modified PVAs; amide-modified PVAs; acetoacetyl group-modified PVAs; diacetone acrylamide modified PVAs; and ethylene-modified PVAs. These may be used alone or in combination with one another. Among these, ethylene modified PVAs are preferred in terms of the water resistance of the resultant aqueous emulsion. The content of the modified group is not particularly limited, and may be 0.5 to 10 mol %. The dispersant may consist essentially of the PVA (B). In the present specification, if a material "consists essentially of a certain component", this means that the total content of components other than the component is less than 10 mass %, preferably less than 5.0 mass %, more preferably less than 1.0 mass %, and even more preferably 0.5 mass %.

The viscosity-average degree of polymerization (which hereinafter may be simply referred to as "degree of polymerization" or "average degree of polymerization") of the PVA (B) may be in a range generally employed for emulsion polymerization. The lower limit of the degree of polymerization is preferably 300 or more, more preferably 350 or more, and even more preferably 400 or more. If the degree of polymerization is less than 300, polymerization stability may be poor during emulsion polymerization. The upper limit of the degree of polymerization is preferably 4000 or less, more preferably 3800 or less, and even more preferably 3500 or less. If the degree of polymerization is more than 4000, the solution viscosity becomes excessively high during emulsion polymerization, which makes stirring and heat removal difficult. The degree of polymerization is determined by a method specified in JIS K 6726 (1994). Specifically, when the degree of saponification is less than 99.5 mol %, the PVA is saponified to or above a degree of saponification of 99.5 mol %, and the viscosity-average degree of polymerization (P) of the saponified PVA is determined by the following equation using a limiting viscosity [η] (liter/g) as measured in water at 30° C.

$$P=([\eta] \times 10^4/8.29)^{(1/0.62)}$$

The mass ratio (A)/(B) of the polymer (A) to PVA (B) in the aqueous emulsion of the present invention is preferably, but not particularly limited to, 98/2 to 80/20 and more preferably 95/5 to 85/15 on a solids basis. If the mass ratio is more than 98/2, the aqueous emulsion may have poor viscosity stability. If the mass ratio is less than 80/20, a coating film formed with the aqueous emulsion may be poor in water resistance.

The content of solids of the aqueous emulsion of the present invention is preferably 30 mass % or more and 60 mass % or less.

<Production Method of Aqueous Emulsion>

An example of a method for producing the aqueous emulsion of the present invention is one in which: 1) ethylenically unsaturated monomer including the ethylenically unsaturated monomer (a) is emulsion polymerized using a properly selected polymerization initiator in the presence of the PVA (B) having a degree of saponification of 80 mol % or more and serving as a dispersant, Examples of the method for controlling the emulsion polymerization include: 2) adjusting the amount of the PVA (B) added with respect to the ethylenically unsaturated monomer (a); and 3) adjusting the amount of ion-exchanged water. A combination of these methods may be used as the method for producing the aqueous emulsion of the present invention.

The method for producing the aqueous emulsion of the present, invention is not particularly limited, and an example of the method is emulsion polymerization of 100 parts by mass of the ethylenically unsaturated monomer including the ethylenically unsaturated monomer (a) in the presence of 0.5 to 40 parts by mass of the dispersant PVA (B). When the dispersant is introduced into the polymerization system in this method, how to introduce and add the dispersant is not particularly limited. Examples of the method for introducing and adding the dispersant include: adding the dispersant to the polymerization system all at once at the beginning of the polymerization; and adding the dispersant continuously during the polymerization. Adding the dispersant to the polymerization system all at once at the beginning of the polymerization is more preferred in terms of increasing the degree of grafting of the PVA (B) on the aqueous emulsion dispersoid.

The amount of the PVA (B) used as a dispersant in the present invention is not particularly limited. In a typical case, the amount of the PVA (B) is preferably 2 mass % or more and more preferably 3 mass % or more with respect to the total monomer units derived from the ethylenically unsaturated monomer including the ethylenically unsaturated monomer (a). If the amount of the PVA (B) used is less than 2 mass %, sufficient emulsion polymerization stability may not be obtained. The upper limit of the amount of the PVA (B) used is preferably 20 mass % or less and more preferably 10 mass % or less with respect to the total monomer units derived from the ethylenically unsaturated monomer. If the amount of the PVA (B) used is more than 20 mass %, a coating film formed using the resultant aqueous emulsion may have low water resistance, hot water resistance, and boiling resistance.

As the polymerization initiator used in the emulsion polymerization, there can be used common emulsion polymerization initiators such as water-soluble single initiators and water-soluble redox initiators. Such initiators may be used alone or in combination with one another. Redox initiators are more preferred.

Examples of the water-soluble single initiators include azo initiators and peroxides such as hydrogen peroxide and persulfuric acid salts (such as potassium persulfate, sodium persulfate, and ammonium persulfate). Examples of the azo initiators include 2,2'-azobis(isobutyronitrile), 2,2'-azobis(2,4-dimethylvaleronitrile), and 2,2'-azobis(4-methoxy-2,4-dimethylvaleronitrile).

The redox initiator to be used can be an initiator consisting of a combination of an oxidant and reductant. A peroxide is preferred as the oxidant. Examples of the reductant include metal ions and reducing compounds. Examples of the combination of an oxidant and reductant include: a combination of a peroxide, and metal ion; a combination of a peroxide and reducing compound; and a combination of a peroxide, metal ion, and reducing compound, Examples of the peroxide include: hydrogen peroxide; hydroperoxides such as cumene hydroperoxide and t-butyl hydroperoxide; persulfuric acid salts (potassium persulfate, sodium persulfate, and ammonium persulfate); t-butyl peroxyacetate; and peresters (t-butyl peroxybenzoate). Examples of the metal ion include metal ions such as $Fe^{2+}$, $Cr^{2+}$, $V^{2+}$, $Co^{2+}$, $Ti^{3+}$, and $Cu^+$ that are capable of accepting one electron transferred. Examples of the reducing compound include sodium hydrogen sulfite, sodium hydrogen carbonate, tartaric acid, fructose, dextrose, sorbose, inositol, rongalite, and ascorbic acid. Preferred among these is a combination of at least one oxidant selected from the group consisting of hydrogen peroxide, potassium persulfate, sodium persulfate, and ammonium persulfate and at least one reductant selected from the group consisting of sodium hydrogen sulfite, sodium hydrogen carbonate, tartaric acid, rongalite, and ascorbic acid, and more preferred is a combination of hydrogen peroxide and at least one reductant selected from the group consisting of sodium hydrogen sulfite, sodium hydrogen carbonate, tartaric acid, rongalite, and ascorbic acid.

For the emulsion polymerization, for example, an alkali metal compound, surfactant, buffer agent, and polymerization degree regulator may be used appropriately, provided that the effect of the present invention is not impaired.

The alkali metal compound is not particularly limited as long as an alkali metal (sodium, potassium, rubidium, and cesium) is included, and may be an alkali metal ion itself or a compound including an alkali metal.

The content of the alkali metal compound (calculated as alkali metal) can be selected as appropriate depending on the type of the alkali metal compound used. The content of the alkali metal compound (calculated as alkali metal) is preferably 100 to 15000 ppm, more preferably 120 to 12000 ppm, and most preferably 150 to 8000 ppm with respect to the total mass of the emulsion (calculated as solids). If the content of the alkali metal compound is less than 100 ppm, the stability of emulsion polymerization for producing the aqueous emulsion may be low, while if the content is more than 15000 ppm, a coating film formed from the aqueous emulsion may be stained. This is why it is not preferable that the content be less than 100 ppm or more than 15000 ppm. The content of the alkali metal compound may be measured by an ICP optical emission spectrometer. The term "ppm" as used herein means "mass ppm".

Specific examples of the compound including an alkali metal include weakly basic alkali metal salts (e.g., alkali metal carbonates, alkali metal acetates, alkali metal bicarbonates, alkali metal phosphates, alkali metal sulfates, alkali metal halides, and alkali metal nitrates) and strongly basic alkali metal compounds (e.g., alkali metal hydroxides and alkali metal alkoxides). These alkali metal compounds may be used alone or in combination with one another.

Examples of the weakly basic alkali metal salts include alkali metal carbonates (such as sodium carbonate, potassium carbonate, rubidium carbonate, and cesium carbonate), alkali metal bicarbonates (such as sodium hydrogen carbonate and potassium hydrogen carbonate), alkali metal phosphates (such as sodium phosphate and potassium phosphate), alkali metal carboxylates (such as sodium acetate, potassium acetate, and cesium acetate), alkali metal sulfates (such as sodium sulfate, potassium sulfate, and cesium sulfate), alkali metal halides (such as cesium chloride, cesium iodide, potassium chloride, and sodium chloride), and alkali metal nitrates (such as sodium nitrate, potassium nitrate, and cesium nitrate). Among these, alkali metal carboxylates, alkali metal carbonates, and alkali metal bicarbonates which can act as a weakly acidic, strongly basic salt when dissociated are preferred to impart basicity to the emulsion, and alkali metal carboxylates are more preferred.

When used, the weakly basic alkali metal salt functions as a pH buffer agent in the emulsion polymerization, which allows the emulsion polymerization to proceed stably.

As the surfactant, a non-ionic surfactant, anionic surfactant, or cationic surfactant may be used. Examples of the non-ionic surfactant include, but are not limited to, polyoxyethylene alkyl ethers, polyoxyethylene alkyl phenyl ethers, polyoxyethylene fatty acid esters, polyoxyalkylene alkyl ethers, polyoxyethylene derivatives, sorbitan fatty acid esters, polyoxyethylene sorbitan fatty acid esters, polyoxyethylene sorbitol fatty acid esters, and glycerin fatty acid esters. Examples of the anionic surfactant include, but are not limited to, alkyl sulfates, alkylaryl sulfates, alkyl sulfonates, sulfates of hydroxy alkanols, sulfosuccinic acid esters, and sulfates and phosphates of alkyl or alkylaryl polyethoxy alkanols. Examples of the cationic surfactant include, but are not limited to, alkylamine salts, quaternary ammonium salts, and polyoxyethylene alkylamines. The amount of the surfactant used is preferably 2 mass % or less with respect to the total amount of the ethylenically unsaturated monomer (e.g., vinyl acetate). It is not preferable that the amount of the surfactant used be more than 2 mass %, because in this case the resultant water resistance, hot water resistance, and boiling resistance may be low.

Examples of the buffering agent include: acids such as acetic acid, hydrochloric acid, and sulfuric acid; bases such as ammonia, amine, caustic soda, caustic potash, and calcium hydroxide; and alkali carbonates, phosphates, and acetates. Examples of the polymerization degree regulator include mercaptans and alcohols.

The dispersion medium used in the emulsion polymerization is preferably an aqueous medium based on water. The aqueous medium based on water may contain an aqueous organic solvent (such as alcohol or ketone) freely soluble in water. The term "aqueous medium based on water" as used herein refers to a dispersion medium containing 50 mass % or more of water. In terms of cost and environmental burden, the dispersion medium is preferably an aqueous medium containing 90 mass % or more of water and is more preferably water. The method for producing the aqueous emulsion preferably includes, before the start of emulsion polymerization, heating the dispersant PVA (B) to dissolve the PVA (B) in the dispersion medium, cooling the resultant solution, and purging the solution with nitrogen. The heating temperature is preferably 90° C. or higher. The temperature during the emulsion polymerization is preferably but not limited to, around 20 to 85° C. and more preferably around 40 to 80° C.

<Adhesive>

An adhesive containing the aqueous emulsion is an embodiment of the present invention. Such an adhesive can be obtained by adding a secondary component such as a plasticizer or crosslinking agent to a primary component comprising the aqueous emulsion of the present invention. A secondary component containing a crosslinking agent is preferred, although such a secondary component is not necessarily required in the present invention.

Examples of the plasticizer include dicarboxylic acid ester compounds and aryloxy-containing compounds.

Examples of the dicarboxylic acid ester compound include 2,2,4-trimethyl-1,3-pentanediol diisobutyrate, methyl adipate, dimethyl succinate, dimethyl glutarate, dibutyl phthalate, diphenyl phthalate, dihexyl phthalate, dicyclohexyl phthalate, dihydroabietyl phthalate, and dimethyl isophthalate.

Examples of the aryloxy group of the aryloxy-containing compound include a phenoxy group and substituted phenoxy group. Examples of the substituted phenoxy group include $C_1$ to $C_{12}$ alkoxyphenoxy groups and $C_1$ to $C_{12}$ alkylphenoxy groups. The number of substituents is preferably, but not limited to, 1 to 5 and more preferably 1 to 3. A substituted or unsubstituted phenoxy-containing compound is preferred as the aryloxy-containing compound, and more preferred is a substituted or unsubstituted phenoxy-containing compound containing no vinyl group. Specific examples of the aryloxy-containing compound include phenoxyethanol, ethylene glycol monophenyl ether, polypropylene glycol monophenyl ether, polyoxyethylene nonylphenyl ether, and polyoxyethylene dinonylphenyl ether. The plasticizer may be used alone or in combination with one another.

The content of the plasticizer may be adjusted according to different situations. The content of solids of the plasticizer is preferably 0.5 to 20 parts by mass and more preferably 1.0 to 10 parts by mass with respect to 100 parts by mass of solids of the primary component. When the content of the plasticizer agent is within the above range, an aqueous emulsion having an excellent adhesiveness can be obtained.

Examples of the crosslinking agent include polyfunctional isocyanate compounds; hydrazine compounds; polyamidoamine epichlorohydrin adducts; aqueous aluminum salts such as aluminum chloride and aluminum nitrate; glyoxal-based resins such as urea-glyoxal-based resins. The polyfunctional isocyanate compound has two or more isocyanate groups in the molecule. Examples of the polyfunctional isocyanate compound include tolylene diisocyanate (TDI) hydrogenated TDI, trimethylolpropane-TDI adduct (e.g., "Desmodur L" of Bayer AG), triphenylmethane triisocyanate, methylene bisphenyl isocyanate (MDI), polymethylene polyphenyl polyisocyanate (PMDI), hydrogenated MDI, polymeric MDI, hexamethylene diisocyanate (HDI), xylylene diisocyanate (XDI), 4,4-dicyclohexylmethane diisocyanate, and isophorone diisocyanate (IPDI). The polyfunctional isocyanate compound used may be a prepolymer resulting from polymerization of polyol with excess polyisocyanate and having a terminal group containing an isocyanate group. These may be used alone or in combination with one another.

The crosslinking agent may be a hydrazine compound. The hydrazine compound is not particularly limited as long as it is a compound having a hydrazino group ($H_2N$—NH—) in in the molecule. Examples of the hydrazine compound include: hydrazine; hydrazine hydrate; hydrazine salts of inorganic acids such as hydrochloric acid, sulfuric acid, nitric acid, sulfurous acid, phosphoric acid, thiocyanic acid, and carbonic acid; hydrazine salts of organic acids such as formic acid and oxalic acid; monosubstituted hydrazines such as methylhydrazine, ethylhydrazine, propylhydrazine, butylhydrazine, and allylhydrazine; and symmetrically disubstituted hydrazines such as 1,1-dimethylhydrazine, 1,1-diethylhydrazine, and 4-n-butyl-methylhydrazine. Furthermore, conventionally known hydrazine compounds can be used. Examples thereof include polyfunctional hydrazide compounds such as oxalic acid dihydrazide, malonic acid dihydrazide, succinic acid dihydrazide, adipic acid dihydrazide, azelaic acid dihydrazide, sebacic acid dihydrazide, dodecanedioic acid dihydrazide, maleic acid dihydrazide, fumaric acid dihydrazide, diglycolic acid dihydrazide, tartaric acid dihydrazide, malic acid dihydrazide, isophthalic acid dihydrazide terephthalic acid dihydrazide, and dimer acid dihydrazide. These hydrazine compounds may be used alone or in combination with one another. Among these, adipic acid dihydrazide is particularly preferred.

The content of the crosslinking agent may be adjusted according to different situations. The content of solids of the crosslinking agent is preferably 3 to 100 parts by mass and more preferably 5 to 50 parts by mass with respect to 100 parts by mass of solids of the primary component. When the content of the crosslinking agent is within the above range, an aqueous emulsion having an excellent adhesiveness can be inexpensively produced.

The aqueous emulsion of the present invention obtained in the above method can be used in adhesive applications for woodworking, paper processing, etc. and also in paints, fiber processing, etc. In particular, the aqueous emulsion composition is suitable for use in adhesive applications. The emulsion can be used per se. The aqueous emulsion may optionally be used in combination with a conventionally known emulsion or commonly used additive to form an emulsion composition, provided that the effect of the present invention is not impaired. Examples of the additive include an organic solvent (e.g., an aromatic compound such as toluene or xylene, alcohol, ketone, ester, or halogenated solvent) crosslinking agent, surfactant, plasticizer, suspension stabilizer, thickener, fluidity improver, preservative, anti-flaming agent, filler, wetting agent, colorant, binder, and water retention agent. These may be used alone or in combination with one another. The aqueous emulsion of the present invention can be used in a wide variety of other applications such as binders for inorganic substances, cement admixtures, and mortar primers. Furthermore, the aqueous emulsion may be spray-dried into a so-called powdery emulsion, which is also effectively used.

The present invention encompasses embodiments obtainable by combining the above features in various manners within the technical scope of the present invention as long as the effect of the present invention can be obtained.

EXAMPLES

Next, the present invention will be described more specifically with Examples. The present invention is by no means limited by the following Examples and can be modified in various ways by those ordinarily skilled in the art within the technical scope of the invention. It should be noted that in the following Examples and Comparative Examples, "%" and "part(s)" refer to "mass %" and "part(s) by mass", respectively, unless otherwise specified.

By the methods described below, aqueous emulsions were measured for their emulsion polymerization stability and adhesives were measured for their adhesiveness (normal state, water resistance, hot water resistance, and boiling resistance), heat resistance, stain resistance under heat treatment, and viscosity stability.

(1) Evaluation of Emulsion Polymerization Stability

An amount of 500 g of each of the aqueous emulsions obtained in Examples and Comparative Examples was filtered through a 60-mesh metal sieve, and the filtration residue was weighed. Evaluation was made as follows.
A: The amount of the filtration residue is 1.0% or less.
B: The amount of the filtration residue is more than 1.0%.
C: Filtration fails due to the particles being coarse because of unstable polymerization.

(2) Evaluation of Adhesiveness (Evaluation in Normal State and Evaluation of Water Resistance, Hot, Water Resistance, and Boiling Resistance)
[Bonding Conditions]
Adherend: Tsuga/Tsuga (straight grain)
Spread: 1.50 g/m² (double spread)
Pressing conditions: At 20° C. for 24 hours with a pressure of 10 kg/cm²
[Measurement Conditions]
The compression shear bond strength was measured according to JIB. K 6852 (1994).
Normal state: The specimen was aged at 20° C. for 7 days, and the as-aged specimen was subjected to the measurement.
Water resistance: The specimen was immersed in water at 30° C. for 3 hours, and the wet specimen was subjected to the measurement.
Hot water resistance: The specimen was immersed in, water at 60° C. for 3 hours, and the wet specimen was subjected to the measurement,
Boiling resistance: The specimen was aged at 20° C. for 7 days, then immersed in boiling water for 4 hours, then dried in air at 60° C. for 20 hours, and further immersed in boning water for 4 hours, after which the specimen was cooled in water at room temperature (20° C.) and the wet specimen was subjected to the measurement.

(3) Evaluation of Heat Resistance

Specimens as used for the evaluation of water resistance were prepared, treated under the following conditions, then measured for their compression shear bond strength.
[Measurement Conditions]
Heat resistance: The specimen was aged at 20° C. for 7 days and then heated by a thermostatic chamber at 80° C. for 1 hour, after which the hot specimen was subjected to the measurement.

(4) Evaluation of Stain Resistance of Coating Film

Each of the adhesives obtained in Examples and Comparative Examples was cast onto a PET film at 20° C. and 65% RH and dried for 7 days, after which the resultant dry product was separated from the PET film to obtain a 500 μm-thick dry coating film. This coating film was secured to a stainless steel mold (a 20 cm×20 cm metal frame with a thickness of 1 cm) by means of a dip and heat-treated by a geer oven at 120° C. for 3 hours, after which the stain resistance of the coating film was visually evaluated as follows.
A: Not stained.
B: Slightly stained.
C. Yellowed.

(5) Evaluation of Viscosity Stability

The viscosity ($\eta_0$) of each of the adhesives obtained in Examples and Comparative Examples was measured with a B-type viscometer (40° C., 20 rpm). The aqueous emulsion was then allowed to stand at 40° C. for 1 month. After that the viscosity ($\eta_{30}$) was measured again with a B-type viscometer (40° C. 20 rpm). Evaluation was made as follows on the basis of a viscosity increase factor which is defined as $\eta_{30}/\eta_0$.
A: The viscosity increase factor is less than 1.5.
B: The viscosity increase factor is 1.5 or more and 2.0 or less.
C: The viscosity increase factor is more than 2.0 and less than 3.0.
D: The viscosity increase factor is 3.0 or more.

Example 1

Synthesis of Em-1

An amount of 275 g of ion-exchanged water and 20.9 g of "PVA-117" (manufactured by KURARAY CO., LTD. and having a degree of saponification of 98.5 mol % and an average degree of polymerization of 1700) were introduced to a 1 L glass polymerization vessel equipped with a reflux condenser, dropping funnel, thermometer, and nitrogen inlet. The PVA-117 was fully dissolved by stirring at 95° C. for 2 hours. To the resultant solution was added 0.3 g of sodium acetate (NaOAc), which was mixed and dissolved in the solution. Next, the aqueous PVA solution was cooled, purged with nitrogen, and then heated to 60° C. under stirring at 200 rpm. This was followed by shot addition of 2.4 g of a 20% aqueous solution of tartaric acid and 3.2 g of a 5% hydrogen peroxide solution (their respective molar ratios to the total amount of the initially-introduced monomer were 0.015) and then by introduction of 26 g of vinyl acetate to initiate polymerization. Completion of the initial polymerization was confirmed (the remaining amount of vinyl acetate was less than 1%) 30 minutes after the start of the polymerization. Shot addition of 1 g of a 10% aqueous solution of tartaric acid and 3.2 g of a hydrogen peroxide solution was performed, and then 250 g of vinyl acetate and 2.8 g of N-(2-methacryloyloxyethyl)ethylene urea were added continuously over 2 hours. The polymerization temperature was maintained at 80° C., and the polymerization was completed to give a polyvinyl acetate emulsion having a solids concentration of 49.1% (the amount of N-(2-methacryloyloxyethyl)ethylene urea contained was 1.0 mass % with respect to the total amount of the ethylenically unsaturated monomer unit; (Em-1)). The emulsion (Em-1) thus obtained was evaluated for polymerization stability, and the amount of the filtration residue was determined to be 1.0% or less. The result of polymerization stability evaluation of Em-1 is shown in Table 1.

(Adhesive-1)

T 100 parts by mass (solids) of Em-1 was added 5 parts by mass of phenoxyethanol as a plasticizer, and the emulsion and phenoxyethanol were mixed to prepare an adhesive. Subsequently, the adhesive was evaluated for adhesiveness under the various conditions, heat resistance, viscosity stability; and stain resistance of a coating film by the methods described above. The results are shown in Table 2.

Example 2

Synthesis of Em-2

An amount of 275 g of ion-exchanged water and 21 g of ethylene-modified PVA 1 (having a degree of polymerization of 1700, a degree of saponification of 95 mol %, and a degree of ethylene modification of 5 mol %) prepared according to a method described in Examples of JP 4772175 B were introduced to a 1 L glass polymerization vessel equipped with a reflux condenser, dropping funnel, thermometer, and nitrogen inlet. The ethylene-modified PVA 1 was fully dissolved by stirring at 95° C. for 2 hours. To the resultant solution was added 0.3 g of sodium acetate (NaOAc), which was mixed and dissolved in the solution. Next, the aqueous ethylene-modified PVA solution was cooled, purged with nitrogen, and then heated to 60° C. under stirring at 200 rpm. This was followed by shot addition of 2.4 g of a 20% aqueous solution of tartaric acid and 3.2 g of a 5% hydrogen peroxide solution (their respective molar ratios to the total amount of the initially-introduced monomer were 0.015) and then by introduction of 28 g of vinyl acetate to initiate polymerization. Completion of the initial polymerization was confirmed (the remaining amount of vinyl acetate was less than 1%) 30 minutes after the start of the polymerization. Shot addition of 1 g of a 10% aqueous solution of tartaric acid and 3.2 g of a 5% hydrogen peroxide solution was performed, and then 250 g of vinyl acetate and 5.6 g of N-(2-methacryloyloxyethyl)ethylene urea were added continuously over 2 hours. The polymerization temperature was maintained at 80° C., and the polymerization was completed to give a polyvinyl acetate emulsion having a solids concentration of 50.2% (the amount of N-(2-methacryloyloxyethyl)ethylene urea contained was 2.0 mass % with respect to the total amount of the ethylenically unsaturated monomer unit; (Em-2)). The emulsion (Em-2) thus obtained was evaluated for polymerization stability, and the amount of the filtration residue was determined to be 1.0% or less. The result of polymerization stability evaluation of Em-2 is shown in Table 1.

(Adhesive-2)

To 100 parts by mass (solids) of Em-2 was added 5 parts by mass of phenoxyethanol as a plasticizer, and the emulsion and phenoxyethanol were mixed to prepare an adhesive. Subsequently, the adhesive was evaluated for adhesiveness under the various conditions, heat resistance, viscosity stability, and stain resistance of a coating film by the methods described above. The results are shown in Table 2.

Example 3

An aqueous emulsion (Em-3) was obtained in the same manner as in Example 2, except for changing the amount of N-(2-methacryloyloxyethyl)ethylene urea used from 2.0 mass % to 5.0 mass %. The result of polymerization stability evaluation of Em-3 is shown in Table 1. Subsequently, Adhesive-3 was prepared in the same manner as Adhesive-1 and evaluated for adhesiveness under the various conditions, heat resistance, viscosity stability, and stain resistance of a coating film. The results are shown in Table 2.

Example 4

An aqueous emulsion (Em-4) was obtained in the same manner as in Example 2, except for changing the amount of N-(2-methacryloyloxyethyl)ethylene urea used from 2.0 mass % to 8.0 mass %, The result of polymerization stability evaluation of Em-4 is shown in Table 1. Subsequently, Adhesive-4 was prepared in the same manner as Adhesive-1 and evaluated for adhesiveness under the various conditions, heat resistance, viscosity stability, and stain resistance of a coating film. The results are shown in Table 2.

Example 5

An aqueous emulsion (Em-5) was obtained in the same manner as in Example 2, except for changing the amount of N-(2-methacryloyloxyethyl)ethylene urea used from 2.0 mass % to 11.0 mass %. The result of polymerization stability evaluation of Em-5 is shown in Table 1. Subsequently, Adhesive-5 was prepared in the same manner as Adhesive-1 and evaluated for adhesiveness under the various conditions, heat resistance, viscosity stability, and stain resistance of a coating film. The results are shown in Table 2.

Example 6

An aqueous emulsion (Em-6) was obtained in the same manner as in Example 1, except for using N-(2-methacryloyloxyethyl)ethylene urea instead of N-(2-methacrylamidoethyl)ethylene urea. The result of polymerization stability evaluation of Em-6 is shown in Table 1. Subsequently, Adhesive-6 was prepared in the same manner as Adhesive-1 and evaluated for adhesiveness under the various conditions, heat resistance, viscosity Stability-, and stain resistance of a coating film. The results are shown in Table 2.

Example 7

An aqueous emulsion (Em-7) was obtained in the same manner as in Example 2, except for changing N-(2-methacryloyloxyethyl)ethylene urea to N-(2-methacrylamidoethyl)ethylene urea and using 1.0 mass % of N-(2-methacrylamidoethyl)ethylene urea with respect to the total amount of the ethylenically unsaturated monomer unit. The result of polymerization stability evaluation of Em-7 is shown in Table 1. Subsequently, Adhesive-7 was prepared in the same manner as Adhesive-1 and evaluated for adhesiveness under the various conditions, heat resistance, viscosity stability, and stain resistance of a coating film. The results are shown in Table 2.

Example 8

Synthesis of Em-8

An amount of 310 g of ion-exchanged water and 19 g of ethylene-modified PVA 2 (having a degree of polymerization of 1700, a degree of saponification of 95 mol %, and a degree of ethylene modification of 5 mol %) prepared according to a method described in examples of JP 4772175 B were introduced to a 1 L glass polymerization vessel equipped with a reflux condenser, dropping funnel, thermometer, and nitrogen inlet. The ethylene-modified PVA 2 was fully dissolved by stirring at 95° C. for 2 hours. To the resultant solution was added 0.3 g of sodium acetate (NaOAc), which was mixed and dissolved in the solution. Next, the aqueous PVA solution was cooled, purged with nitrogen, and then heated to 60° C. under stirring at 200 rpm. This was followed by shot addition of 2.4 g of a 20% aqueous solution of tartaric acid and 3.2 g of a 5% hydrogen peroxide solution (their respective molar ratios to the total amount of the initially-introduced monomer were 0.015) and then by introduction of 25 g of vinyl acetate to initiate polymerization. Completion of the initial polymerization was confirmed (the remaining amount of vinyl acetate was less than 1%) 30 minutes after the Start of the polymerization. Shot addition of 1 g of a 10% aqueous solution of tartaric add and 3.2 g of a 5% hydrogen peroxide solution was performed, and then 226 g of vinyl acetate and 5 g of N-(2-methacrylamidoethyl)ethylene urea were added continuously over 2 hours. The polymerization temperature was maintained at 80° C., and the polymerization was completed to give a polyvinyl acetate emulsion having a solids concentration of 44.5% (the amount of N-(2-methacrylamidoethyl)ethylene urea contained was 2.0 mass % with respect to the total amount of the ethylenically unsaturated monomer unit; (Em-8)). The emulsion (Em-8) thus obtained was evaluated for polymerization stability, and the amount of the filtration residue was determined to be 1.0% or less. The result of polymerization stability evaluation of Em-8 is shown in Table 1.

(Adhesive-8)

To 100 parts by mass (solids) of Em-8 was added 5 parts by mass of phenoxyethanol as a plasticizer, and the emulsion and phenoxyethanol were mixed to prepare Adhesive-8. Subsequently, Adhesive-8 was evaluated for adhesiveness under the various conditions, heat resistance, viscosity stability, and stain resistance of a coating film by the methods described above. The results are shown in Table 2.

Example 9

An aqueous emulsion (Em-9) was, obtained in the same manner as in Example 2, except for using 0.5 mass % of N-(3-allyloxy-2-hydroxypropyl)aminoethylethyleneurea instead of N-(2-methacryloyloxyethyl)ethylene urea. The result of polymerization stability evaluation of Em-9) is shown in Table 1. Subsequently, Adhesive-9 was prepared in the same manner as Adhesive-1 and evaluated for adhesiveness under the various conditions, heat resistance, viscosity stability, and stain resistance of a coating film. The results are, shown in Table 2.

Example 10

Synthesis of Em-10

An amount of 360 g of ion-exchanged water, 24.3 g of polyvinyl alcohol "PVA-205" (manufactured by KURARAY CO., LTD. and having a degree of saponification of 88 mol % and an average degree of polymerization of 500), and 2.9 g of "PVA-217" (manufactured by KURARAY CO., LTD. and having a degree of saponification of 88 mol % and an average degree of polymerization of 1700) were introduced to a stainless steel autoclave having a volume of 1.5 liters and equipped with an anchor stirrer. The PVAs were fully dissolved by stirring at 95° C. for 2 hours. To the resultant solution was added 0.04 g of sodium acetate (NaOAc). Next, 350 g of vinyl acetate and 3.65 g of N-(2-methacryloyloxyethyl)ethylene urea were introduced, and the internal atmosphere of the autoclave was thoroughly purged with ethylene. Subsequently, 19.5 g of a 10% aqueous ascorbic acid solution was introduced. Under stirring, the polymerization temperature was adjusted to 60° C., and the ethylene pressure was increased to 5.0 MPa. An amount of 100 g of a 1% hydrogen peroxide solution was added uniformly over 8 hours, and 117 g of vinyl acetate and 1.22 g of N-(2-methacryloyloxyethyl)ethylene urea were added uniformly over 6 hours. The ethylene pressure was maintained at 5.0 MPa until the completion of addition of vinyl acetate and N-(2-methacryloyloxyethyl)ethylene urea. The completion of catalyst addition was followed by cooling and then by addition of an anti-foaming agent and pH adjuster, giving an aqueous emulsion (the amount of N-(2-methacryloyloxyethyl)ethylene urea contained was 1.0 mass % with respect to the total amount of the ethylenically unsaturated monomer unit; (Em-10)). The emulsion (Em-10) thus obtained was evaluated for polymerization stability; and the amount of the filtration residue was determined to be 1.0% or less. The result of polymerization stability evaluation of Em-10 is shown in Table 1.

(Adhesive-10)

To 100 parts by mass (solids) of Em-10 was added 5 parts by mass of phenoxyethanol as a plasticizer, and the emulsion and phenoxyethanol were mixed to prepare Adhesive-10. Subsequently, Adhesive-10 was evaluated for adhesiveness under the various conditions, heat resistance, viscosity stability, and stain resistance of a coating film by the methods described above. The results are shown in Table 2.

Comparative Example 1

An aqueous emulsion (Em-11) was obtained in the same manner as in Example 1, except for not using N-(2-methacryloyloxyethyl)ethylene urea. The result of polymerization stability evaluation of Em-11 is shown in Table 1. Subsequent Adhesive-11 was prepared in the same manner as Adhesive-1 and evaluated for adhesiveness under the various conditions, heat resistance, viscosity stability, and stain resistance of a coating film by the methods described above. The results are shown in Table 2.

Comparative Example 2

An aqueous emulsion (Em-12) was obtained in the same manner as in Example 1, except for using 3.0 mass % of N-methylol acrylamide instead of N-(2-methacryloyloxyethyl)ethylene urea. The result of polymerization stability evaluation of Em-12 is shown in Table 1. Next, to 100 parts by mass (solids) of Em-12 was added 5 parts by mass of phenoxyethanol as a plasticizer, and the emulsion and phenoxyethanol were mixed. To 100 parts by mass of the resultant plasticizer-containing Em-12 was added 1.5 parts by mass of $AlCl_3$ as a crosslinking agent to prepare Adhesive-12. Subsequently, Adhesive-12 was evaluated for adhesiveness under the various conditions, heat resistance, viscosity stability, and stain resistance of a coating film by the methods described above. The results are shown in Table 2.

Comparative Example 3

An aqueous emulsion (Em-13) was obtained in the same manner as in Example 2, except for not using N-(2-methacryloyloxyethyl)ethylene urea. The result of polymerization stability evaluation of Em-13 is shown in Table 1. Subsequently, Adhesive-13 was prepared in the same manner as Adhesive-1 and evaluated for adhesiveness under the various conditions, heat resistance, viscosity stability, and stain resistance of a coating film by the methods described above. The results are shown in Table 2.

Comparative Example 4

An aqueous emulsion (Em-14) was obtained in the same manner as in Example 8, except for not using N-(2-methacrylamidoethyl)ethylene urea. The result of polymerization stability evaluation of Em-14 is shown in Table 1. Subsequently, Adhesive-14 was prepared in the same manner as Adhesive-1 and evaluated for adhesiveness under the various conditions, heat resistance, viscosity stability, and stain resistance of a coating film by the methods described above. The results are shown in Table 2.

Comparative Example 5

An emulsion (Em-15) was prepared according to Example 1 of Patent Literature 1 (JP 08-060116 A), The composition of Em-15 is shown in Table 1. The result of polymerization stability evaluation of Em-15 is shown in Table 1. In Table 1, "Mowiol™ 18-88" denotes a partially-hydrolyzed polyvinyl alcohol having a degree of hydrolysis of 88 mol %. To 100 parts by mass (solids) of Em-15 was added 5 parts by mass of phenoxyethanol as a plasticizer, and the emulsion and phenoxyethanol were mixed. To 100 parts by mass of the resultant plasticizer-containing Em-15 were added 3.4 parts by mass of AlCl$_3$ and 25 parts of a 20% aqueous solution of glutardialdehyde-bis(sodium hydrogen sulfite) gas crosslinking agents to prepare Adhesive-15. Subsequently, Adhesive-15 was evaluated for adhesiveness under the various conditions, heat resistance, viscosity stability, and stain resistance of a coating film by the methods described above. The results are shown in Table 2.

Comparative Example 6

An emulsion (Em-16) was prepared according to Example 1 of Patent Literature 4 (JP 2001-123138 A). The composition of Em-16 is shown in Table 1. The result of polymerization stability evaluation of Em-16 is shown in Table 1. Subsequently, Adhesive-16 was prepared in the same manner as Adhesive-1 and evaluated for adhesiveness under the various conditions, heat resistance, viscosity stability, and stain resistance of a coating film by the methods described above. The results are shown in Table 2.

Comparative Example 7

An emulsion (Em-17) was prepared according to Example I-b of Patent Literature 8 (JP 2003-523476 A), The composition of Em-17 is shown in Table 1. The result of polymerization stability evaluation of Em-17 is shown in Table 1. Subsequently, Adhesive-17 was prepared in the same manner as Adhesive-1 and evaluated for adhesiveness under the various conditions, heat resistance, viscosity stability, and stain resistance of a coating film by the methods described above. The results are shown in Table 2.

|  | Ethylenically unsaturated monomer (a) | | Ethylenically unsaturated monomer (b) | | | Polymerization Stability |
|---|---|---|---|---|---|---|
|  | Type | (Mass %) | Type-1 | Type-2 | Type of PVA (B) |  |
| Em-1 | N-(2-methacryloyloxyethyl)ethylene urea | 1.0 | Vinyl acetate | — | PVA-117 | A |
| Em-2 | N-(2-methacryloyloxyethyl)ethylene urea | 2.0 | Vinyl acetate | — | Ethylene-modified PVA 1 | A |
| Em-3 | N-(2-methacryloyloxyethyl)ethylene urea | 5.0 | Vinyl acetate | — | Ethylene-modified PVA 1 | A |
| Em-4 | N-(2-methacryloyloxyethyl)ethylene urea | 8.0 | Vinyl acetate | — | Ethylene-modified PVA 1 | A |
| Em-5 | N-(2-methacryloyloxyethyl)ethylene urea | 11.0 | Vinyl acetate | — | Ethylene-modified PVA 1 | B |
| Em-6 | N-(2-methacrylamidothyl)ethylene urea | 1.0 | Vinyl acetate | — | PVA-117 | A |
| Em-7 | N-(2-methacrylamidothyl)ethylene urea | 1.11 | Vinyl acetate | — | Ethylene-modified PVA 1 | A |
| Em-8 | N-(2-methacrylamidothyl)ethylene urea | 2.0 | Vinyl acetate | — | Ethylene-modified PVA 2 | A |
| Em-9 | N-(3-allyloxy-2-hydroxypropyl)aminoethyl-ethyleneurea | 0.5 | Vinyl acetate | — | Ethylene-modified PVA 1 | A |
| Em-10 | N-(2-methacryloyloxyethyl)ethylene urea | 1.0 | Vinyl acetate | Ethylene | PVA-217, PVA-205 | A |
| Em-11 | Not used | 0 | Vinyl acetate | — | PVA-117 | A |
| Em-12 | N-methylol acrylamide | 3.0 | Vinyl acetate | — | PVA-117 | A |
| Em-13 | Not used | 0 | Vinyl acetate | — | Ethylene-modified PVA 1 | A |
| Em-14 | Not used | 0 | Vinyl acetate | — | Ethylene-modified PVA 2 | A |
| Em-15 | Not used | 0 | Vinyl acetate | — | Mowiol™ 18-88 | A |
| Em-16 | Not used | 0 | Vinyl acetate | — | Ethylene-modified PVA (RS 110), polyacrylic acid | A |
| Em-17 | Ethylureido methacrylate | 0.5 | Butyl acrylate | Acrylonitrile, methacrylic acid, methyl methacrylate | (Ethoxylated fatty alcohol sulfate), (ethoxylated fatty alcohol) | A |

TABLE 2

|  | Type of adhesive | Adhesiveness test | | | Heat resistance (kg/cm$^2$) | Staining of coating film | Viscosity stability |
|---|---|---|---|---|---|---|---|
|  |  | Normal state (kg/cm$^2$) | Hot water resistance (kg/cm$^2$) | Boiling resistance (kg/cm$^2$) |  |  |  |
| Example 1 | Adhesive-1 | 115 | 30 | 21 | 45 | A | A |
| Example 2 | Adhesive-2 | 115 | 30 | 30 | 55 | A | A |
| Example 3 | Adhesive-3 | 119 | 35 | 33 | 60 | A | A |
| Example 4 | Adhesive-4 | 117 | 34 | 38 | 61 | A | A |
| Example 5 | Adhesive-5 | 120 | 40 | 35 | 57 | A | B |
| Example 6 | Adhesive-6 | 105 | 40 | 24 | 50 | A | A |

TABLE 2-continued

| | | Adhesiveness test | | | | Staining | |
| | Type of adhesive | Normal state (kg/cm$^2$) | Hot water resistance (kg/cm$^2$) | Boiling resistance (kg/cm$^2$) | Heat resistance (kg/cm$^2$) | of coating film | Viscosity stability |
|---|---|---|---|---|---|---|---|
| Example 7 | Adhesive-7 | 117 | 43 | 33 | 77 | A | A |
| Example 8 | Adhesive-8 | 120 | 37 | 30 | 69 | A | A |
| Example 9 | Adhesive-9 | 120 | 42 | 40 | 62 | A | B |
| Example 10 | Adhesive-10 | 112 | 50 | 46 | 53 | A | A |
| Comparative Example 1 | Adhesive-11 | 109 | 6 | N/A | 31 | A | A |
| Comparative Example 2 | Adhesive-12 | 115 | 14 | 22 | 47 | C | C |
| Comparative Example 3 | Adhesive-13 | 111 | 24 | N/A | 34 | A | A |
| Comparative Example 4 | Adhesive-14 | 114 | 18 | N/A | 36 | A | A |
| Comparative Example 5 | Adhesive-15 | 122 | 56 | 45 | 64 | B | D |
| Comparative Example 6 | Adhesive-16 | 119 | 24 | 27 | 38 | A | C |
| Comparative Example 7 | Adhesive-17 | 97 | 13 | N/A | 20 | A | A |

In the table, N/A indicates that the property is not measurable.

INDUSTRIAL APPLICABILITY

The adhesive using the aqueous emulsion of the present invention is excellent in heat resistance and also in water resistance (particularly hot water resistance and boiling resistance) and viscosity stability, forms a coating film resistant to staining by heat treatment, and can be used in adhesive applications for woodworking, paper processing, etc. and also in paints, fiber processing, etc.

The invention claimed is:

1. An aqueous emulsion, comprising:
an ethylenically unsaturated monomer unit-containing polymer (A) as a dispersoid and
a vinyl alcohol polymer (B) as a dispersant,
wherein the ethylenically unsaturated monomer unit-containing polymer (A) comprises a structural unit derived from a radical-polymerizable ethylenically unsaturated monomer (a) having a functional group of formula (W):

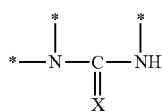
(W)

wherein X is O or S, and * represents a bond,
wherein the vinyl alcohol polymer (B) has a degree of saponification of 80 mol % or more,
wherein the emulsion comprises no polyaldehyde capable of releasing aldehyde groups in an acid medium, and
wherein the polymer (B) has a viscosity-average degree of polymerization in a range of from 300 to 4000.

2. The emulsion of claim 1, wherein the ethylenically unsaturated monomer (a) is at least one ethylenically unsaturated monomer selected from the group consisting of a first compound of formula (I), a second compound of formula (II), and a third compound of formula (III):

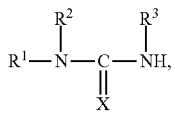
(I)

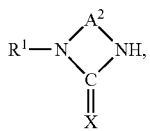
(II)

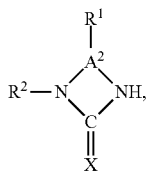
(III)

wherein
X is O or S,
R$^1$ is a 2-(2-carboxyacrylamide)ethyl group, a vinyl group, an allyl group, an isopropenyl group, an acryloyl group, a methacryloyl group, a 2-hydroxy-3-(allyloxy) propyl group, or a functional group of formula (IV): R$^4$-A$^1$-Alk- (IV), wherein R$^4$ is a 2-hydroxy-3-(allyloxy)propyl group, a vinyl group, a methacryloyl group, an acryloyl group, or a methacryloyloxyaceto group, A$^1$ is —O— or —NR$^5$—, R$^5$ is H or a C$_1$ to C$_8$ alkyl group, and Alk is a C$_2$ to C$_8$ alkylene chain,
R$^2$ and R$^3$ are independently H or a C$_1$ to C$_8$ alkyl group, and
A$^2$ is an alkylene chain having 2 or 3 carbon atoms, the alkylene chain optionally comprising a substituent and/or a carbonyl group between the carbon atoms.

3. The emulsion of claim 1, wherein the degree of saponification of the polymer (B) is in a range of from 85 to 99.5 mol %.

4. The emulsion of claim 2, wherein R$^1$ in the formulae (I), (II), and (III) is the functional group of the formula (IV).

5. The emulsion of claim 2, wherein
X in the formulae (I), (II), and (III) is O,
$R^1$ in the formulae (I), (II), and (III) is the functional group of the formula (IV), wherein Alk is a $C_2$ to $C_6$ alkylene chain, and
$A^2$ in the formulae (II) and (III) is an alkylene chain having 2 carbon atoms.

6. The emulsion of claim 2, wherein $A^2$ in the formulae (II) and (III) is an unsubstituted alkylene chain.

7. The emulsion of claim 1, wherein the ethylenically unsaturated monomer (a) is N-(2-methacryloyloxyethyl)ethylene urea or N-(2-methacrylamidoethyl)ethylene urea.

8. The emulsion of claim 1, wherein the ethylenically unsaturated monomer unit-containing polymer (A) comprises a copolymer of the ethylenically unsaturated monomer (a) and a copolymerizable ethylenically unsaturated monomer (b).

9. The emulsion of claim 8, wherein the ethylenically unsaturated monomer (b) is at least one selected from the group consisting of a vinyl ester monomer, a (meth)acrylic acid ester monomer, a styrene monomer, and a diene monomer.

10. The emulsion of claim 1, wherein a mass ratio (A)/(B) of the polymer (A) to the vinyl alcohol polymer (B) is in a range of from 98/2 to 80/20 on a solids basis.

11. An aqueous emulsion, comprising:
an ethylenically unsaturated monomer unit-containing polymer (A) as a dispersoid; and
a vinyl alcohol polymer (B) as a dispersant,
wherein the ethylenically unsaturated monomer unit-containing polymer (A) comprises a structural unit derived from a radical-polymerizable ethylenically unsaturated monomer (a) having a functional group of formula (W):

(W)

wherein X is O or S, and * represents a bond,
wherein the vinyl alcohol polymer (B) has a degree of saponification of 80 mol % or more,
wherein the emulsion comprises no polyaldehyde capable of releasing aldehyde groups in an acid medium, and
wherein the vinyl alcohol polymer (B) is an ethylene-modified vinyl alcohol polymer.

12. An adhesive, comprising:
the emulsion of claim 1.

13. A method for producing the emulsion of claim 1, the method comprising:
polymerizing a monomer comprising the ethylenically unsaturated monomer (a) in the presence of the vinyl alcohol polymer (B).

14. The emulsion of claim 1, wherein the ethylenically unsaturated monomer (a) comprises a first compound of formula (I), a second compound of formula (II), and/or a third compound of formula (III):

(I)

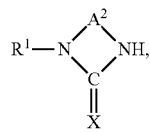
(II)

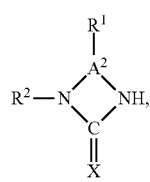
(III)

wherein
X is O or S,
$R^1$ is a 2-(2-carboxyacrylamide)ethyl group, a vinyl group, an allyl group, an isopropenyl group, an acryloyl group, a methacryloyl group, a 2-hydroxy-3-(allyloxy)propyl group, or a functional group of formula (IV): $R^4$-$A^1$-Alk- (IV), wherein $R^4$ is a 2-hydroxy-3-(allyloxy)propyl group, a vinyl group, an acryloyl group, or a methacryloyloxyaceto group, $A^1$ is —O— or —$NR^5$—, $R^5$ is H or a $C_1$ to $C_8$ alkyl group, and Alk is a $C_2$ to $C_8$ alkylene chain, and
$R^2$ and $R^3$ are independently H or a $C_1$ to $C_8$ alkyl group,
$A^2$ is an alkylene chain having 2 or 3 carbon atoms, the alkylene chain optionally comprising a substituent and/or a carbonyl group between the carbon atoms.

15. The emulsion of claim 14, wherein the ethylenically unsaturated monomer (a) comprises the first compound of formula (I).

16. An aqueous emulsion, comprising:
an ethylenically unsaturated monomer unit-containing polymer (A) as a dispersoid and
a vinyl alcohol polymer (B) as a dispersant,
wherein the ethylenically unsaturated monomer unit-containing polymer (A) comprises a structural unit derived from a radical-polymerizable ethylenically unsaturated monomer (a) having a functional group of formula (W);

(W)

wherein X is O or S, and * represents a bond,
wherein the vinyl alcohol polymer (B) has a degree of saponification of 80 mol % or more,
wherein the emulsion comprises no polyaldehyde capable of releasing aldehyde groups in an acid medium, and
wherein the ethylenically unsaturated monomer (a) comprises a third compound of formula (III):

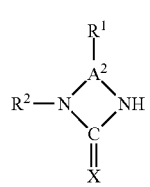
(III)

wherein

X is O or S,

R$^1$ is a 2-(2-carboxyacrylamide)ethyl group, a vinyl group, an allyl group, an isopropenyl group, an acryloyl group, a methacryloyl group, a 2-hydroxy-3-(allyloxy) propyl group, or a functional group of formula (IV): R$^4$-A$^1$-Alk- (IV), wherein R$^4$ is a 2-hydroxy-3-(allyloxy)propyl group, a vinyl group, a methacryloyl group, an acryloyl group, or a methacryloyloxyaceto group, A$^1$ is —O— or —NR$^5$—, R$^5$ is H or a C$_1$ to C$_8$ alkyl group, and Alk is a C$_2$ to C$_8$ alkylene chain, and R$^2$ is H or a C$_1$ to C$_8$ alkyl group, A$^2$ is an alkylene chain having 2 or 3 carbon atoms, the alkylene chain optionally comprising a substituent and/or a carbonyl group between the carbon atoms.

17. The emulsion of claim 14, wherein R$^1$ is the functional group of formula (IV).

18. The emulsion of claim 8, wherein the ethylenically unsaturated monomer (b) comprises a vinyl ester monomer, a (meth)acrylic acid ester monomer, a styrene monomer, and/or a diene monomer.

19. The emulsion of claim 14, wherein the ethylenically unsaturated monomer (a) comprises the second compound.

\* \* \* \* \*